Dec. 31, 1957     L. E. GROSSET     2,818,092
UNIVERSAL WORK SUPPORT
Filed April 26, 1956
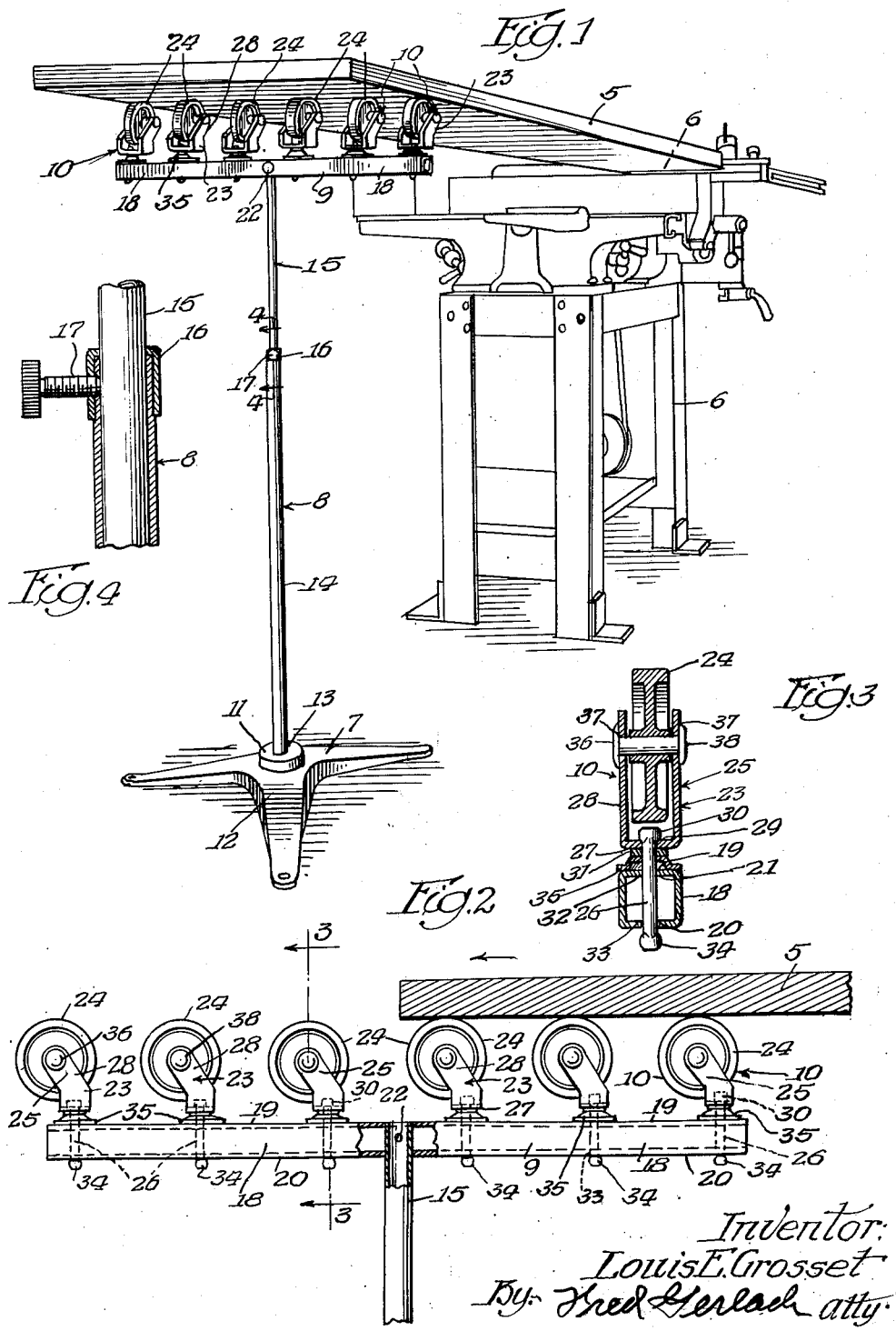
Inventor:
Louis E. Grosset

United States Patent Office 2,818,092
Patented Dec. 31, 1957

2,818,092

UNIVERSAL WORK SUPPORT

Louis E. Grosset, Chicago, Ill.

Application April 26, 1956, Serial No. 580,840

3 Claims. (Cl. 143—132)

The present invention relates generally to work supports. More particularly, the invention relates to that type of work support which is known in the art as a "Universal Work Support," is designed primarily for use in a workshop or similar establishment in connection with a power operated tool, such, for example, as a motor driven band, rotary or scroll saw, operates when in use movably to support the free end of an elongated workpiece (board or the like) while the other end is being manually manipulated or fed with respect to the power driven tool, and as its parts or components comprises a base, a vertically adjustable standard in the form of upper and lower telescopically connected parts, a crossbar at the upper end of the upper part of the standard, and a longitudinal series of separately formed equidistantly spaced rotary work supporting members on the top portion of the crossbar.

As evidenced by United States Patent No. 2,237,615, granted on April 8, 1941 and entitled "Universal Work Support," it has heretofore been proposed to utilize anti-friction balls as the rotary members in a universal work support of the aforementioned type. In practice, it has been found that if the rotary workpiece supporting members are in the form of anti-friction balls, the support as a whole is subject to certain objections. In the first place, the anti-friction balls because they are rotatable universally and have only point contact with the bottom surface of the workpiece have no rectilinear guiding effect on the superjacent end of the workpiece when the workpiece is fed longitudinally with respect to the tool, as for example, in connection with rip-sawing and hence there is a marked tendency for the saw line to be curved or not truly parallel to the edges of the workpiece that extend lengthwise of or parallel to the intended direction of feed movement of the work piece. Secondly, the anti-friction balls because they have only point contact with the bottom surface of the workpiece tend, in connection with use of the support, to dig into, and produce undesirable groove-like lines in, the bottom surface of the workpiece. Thirdly, the anti-friction balls are not at all times free-rolling and have a marked tendency when sawdust, gum or other foreign material is deposited thereon to bind or jam in their respective sockets. Fourthly, the antifriction balls, due to the fact that they are comparatively small in diameter and have only the upper portions thereof exposed, do not, when the workpiece is fed toward them in such manner that the leading edge is below the top portions, function automatically to cause the leading edge of the workpiece to roll up onto their top portions.

The primary object of this invention is to provide a universal work support which is an improvement upon, and eliminates the objections to, previously designed similar supports including in particular that of aforementioned United States Patent No. 2,237,615, and is characterized by the fact that the rotary workpiece supporting members are in the form of conventional offset wheel variety casters instead of anti-friction balls. By utilizing casters the wheels of which have line contact with the bottom surface of the workpiece, the workpiece in connection with use of the support is subjected to a marked or pronounced rectilinear guiding action when fed longitudinally with respect to the power operated tool with which the support is used, and in addition there is no likelihood whatsoever of the bottom surface of the workpiece being marred or scored. When the improved universal support is used in connection with longitudinal feed of the workpiece to or from the associated power operated tool, the casters in connection with the initial increment of movement of the workpiece swing or swivel in the direction of movement of the workpiece into a position wherein the wheels are in parallel relation with the direction of movement. When the wheels are so positioned, the contact lines of the wheels with respect to the bottom surface of the workpiece extend at true right angles to the direction of movement of the workpiece and hence the wheels tend to remain in parallel relation with the direction of movement of the workpiece and thus serve frictionally and automatically to guide the workpiece rectilinearly in connection with completion of feed movement thereof either toward or away from the power driven tool. One advantage in utilizing offset wheel variety casters instead of anti-friction balls is that the wheels of such casters are freely rotatable about their axes at substantially all times and are not subject to binding or jamming in the event that sawdust, gum or other foreign matter is deposited on their peripheries. Another advantage in utilizing casters of the aforementioned type is that, in connection with feed of a workpiece toward the support, the wheels because of their comparatively large diameter tend, in the event that they are engaged by the leading edge of the workpiece at a point slightly above their axes, automatically to guide the adjacent end of the workpiece upwards onto the top portions of the wheel peripheries.

Another object of the invention is to provide a universal work support of the character heretofore mentioned and in which the crossbar is of simple and novel design and is in the form of a tube of rectangular cross section.

A further object of the invention is to provide a universal work support which is generally of new and improved construction, effectively and efficiently fulfills its intended purpose, and is capable of being produced at an extremely low cost.

Other objects of the invention and the various advantages and characteristics of the present universal work support will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a perspective showing a universal work support embodying the invention in underlying or supporting relation with one end of a board the other end of which is being worked upon by a power operated tool, the casters of the support being shown in the position they automatically assume in connection with feed of the board longitudinally towards the tool;

Figure 2 is a view partly in side elevation and partly in section of the upper portion of the universal work support, the casters being shown in the position they automatically assume when the workpiece to which the support is applied is moved or fed transversely in one direction with respect to the power operated tool;

Figure 3 is a vertical longitudinal section taken on the line 3—3 of Figure 2, illustrating in detail the construction and design of one of the offset wheel variety casters, and showing the manner in which the caster is connected to the crossbar for rotary or swivel movement about a vertical axis; and Figure 4 is an enlarged vertical section taken on the line 4—4 of Figure 1 and illustrating the construction and arrangement of the means for releasably locking the upper part of the standard in the various positions into which it is slid or adjusted with respect to the lower part.

The universal work support which is shown in the drawing constitutes the preferred form or embodiment of the invention. It is primarily adapted for use in connection with a workshop or similar establishment and operates when in use movably to support the free end of an elongated workpiece while the other end is manually manipulated or fed with respect to a power driven tool. The workpiece which is shown in Figure 1 of the drawing is identified by the reference numeral 5 and is a wooden board, it being understood, however, that the workpiece may be any other elongated object such as a strip of metal. The power operated tool which is shown in Figure 1 is identified by the reference numeral 6 and is a motor driven rotary saw, it being understood that the tool may be any type of tool which is used to perform work on an elongated workpiece which due to its length is unwieldly to feed or manipulate with respect to the tool. As shown in the drawing, the support when in use is positioned under the free end of the board 5, i. e., the end of the board that is farther from the power operated tool 6. As its components or parts the universal work support consists of a base 7, a vertically adjustable standard 8, a crossbar 9 and a horizontal series of equidistantly spaced conventional offset wheel variety casters 10.

The base 7 of the universal work support is adapted to rest on the floor of the workshop or other establishment wherein the support is used or employed. It is preferably in the form of a metal stamping and consists of a central part 11 and three outwardly extending equidistantly spaced feet-like parts 12. The central part 11 of the base 7 has a vertically extending socket 13, and the feet-like parts 12 are connected to, and project radially from, the central part 11. The feet-like parts 12 are preferably downwardly and outwardly inclined and may if desired be provided with rubber pads (not shown) at their extremities.

The vertically adjustable standard 8 is connected to, and projects outwards from, the base 7 and serves to hold the crossbar 9 in an elevated position with respect to the floor. It permits the crossbar to be raised or lowered to a limited extent in order to position the casters 10 as desired and consists of a tubular lower part 14 and a tubular upper part 15. The lower end of the lower part 14 fits snugly within the vertically extending socket 13 in the central part 11 of the base 7 and the upper end of the lower part is provided with a ferrule 16. The upper part 15 of the standard 8 is of less transverse dimension than the lower part 14 and has its lower end portion disposed slidably within the upper end portion of said lower part. A horizontally extending thumb screw 17 serves releasably to hold the upper part 15 of the standard in the various positions into which it is slid with respect to the lower part 14. Said thumb screw is located at the upper end of the lower part 14 of the standard and extends through registering screw threaded holes in the ferrule 16 and the upper end of the lower part 14. When the thumb screw is loosened, the upper part 15 of the standard is released and hence may be slid upwards or downwards to any desired extent within a limited range. When the thumb screw is tightened after the upper part has been slid into its desired position it serves to lock or secure the upper part in place.

The crossbar 9 of the universal work support is located at the upper end of the upper part 15 of the standard 8 and extends truly horizontally. It is in the form of a metallic tube of rectangular cross section and consists of a pair of spaced apart vertically extending side walls 18, a horizontally extending top wall 19 and a horizontally extending bottom wall 20. The central portions of the top and bottom walls 19 and 20 are provided with coaxial or vertically aligned holes 21 through which the upper end of the upper part 15 of the standard 8 extends. The crossbar 9 is fixedly connected to the upper end of the upper part 15 of the standard by way of a horizontal bolt 22 which extends through aligned holes in the central portions of the crossbar side walls 18 and a pair of diametrically opposite registering holes in the upper end of the upper standard part 15.

The casters 10 are associated with and disposed for the most part above the crossbar 9 of the universal work support and, as heretofore indicated or pointed out, are conventional or standard so far as design and construction are concerned. They are positioned in a normally inverted manner and consist of frames or yokes 23 and wheels 24. As best shown in Figure 2 of the drawing, the casters are spaced equidistantly apart and are arranged in a rectilinear series which extends lengthwise or longitudinally of the crossbar 9. Although there are six casters shown in the drawing, it is to be understood that more or less may be employed or utilized depending upon the width of the workpiece to be supported. The frames or yokes 23 of the casters are positioned in an upstanding manner and consist of U-shaped brackets 25 and depending pintles 26. The U-shaped brackets 25 of the frames 23 are in the form of metallic stampings and consist of horizontally extending intermediate pieces 27 and pairs of spaced apart upwardly extending end pieces 28. The horizontally extending intermediate pieces 27 of the brackets have centrally disposed holes 29 therein and overlie, and are positioned a small distance above, the horizontally extending top wall 19 of the crossbar 9 (see Figure 3). The end pieces 28 of the U-shaped brackets 25 are upwardly inclined at an angle of approximately 160° with respect to the horizontal in order that their upper extremities are horizontally offset with respect to the intermediate pieces 27. The pintles 26 of the casters 10 extend vertically and have the upper ends thereof extending through the holes 29 in the central portions of the intermediate pieces 27 of the U-shaped brackets 25 as shown in Figure 3. The upper extremities of the pintles are upset to form heads 30 which overlie the central hole defining portions of the intermediate pieces 27 and serve to hold the pintles against downward displacement with respect to the U-shaped brackets 25. The portions of the pintles that are disposed a small distance beneath the heads 30 are provided with annuluses 31 which are fixedly secured in place by way of so-called drive or pressed fits and directly underlie the intermediate pieces 27 of the U-shaped brackets 25 and coact therewith to prevent upward displacement of the pintles with respect to said U-shaped brackets. The central portions of the pintles 26 extend rotatably through holes 32 in the crossbar top wall 19 and registering or vertically aligned holes 33 in the bottom wall 20 to the end that the caster frames are permitted to rotate or swivel about vertical axes. The lower ends of the pintles project a small distance beneath the crossbar bottom wall 20 and are laterally upset to form heads 34 which coact with said bottom wall 20 to prevent upward displacement of the caster frames with respect to the crossbar. Frusto conical washers 35 rest on the crossbar top wall 19 and underlie and support the annuluses 31. They surround the portions of the pintles that are directly beneath the annuluses 31 and form bearings whereby the caster frames are supported so that they swivel or rotate freely. The wheels 24 of the casters 10 are disposed between the upwardly extending and inclined end pieces 28 of the U-shaped brackets 25 and have comparatively wide cylindrical peripheries. They are rotatably mounted on horizontally extending pivot pins 36 which extend through pairs of aligned holes 37 in the upper ends of the end pieces 28 of the U-shaped brackets 25 and at the extremities thereof enlarged heads 38. The latter as shown in Figure 3 coact with the upper ends of the end pieces 28 to hold the pivot pins 36 against axial displacement with respect to the U-shaped brackets 25 of the casters. By reason of the fact that the end pieces 28 of the U-shaped brackets 25 are inclined with respect to the horizontal, the axes of the wheels 24 are laterally or horizontally offset with respect to the pintles 26 which form the vertical axis about which the axis frames rotate or swivel. When the universal work support is in use, the upper portions of the peripheries of the caster wheels 24 engage the bottom surface of the board 5 as shown in Figures 1 and 2 and have line contact with the board as contradistinguished from point contacts.

When it is desired to use the universal work support to support the board 5 so that it may be worked on by the motor driven saw 6, the support is positioned a proper distance away from the saw and then one end of the board 5 is placed on the bed plate of the saw and the other end of the board is placed on the wheels 24 of the inverted casters 10 as shown in Figure 1. Preferably, the support is arranged or positioned so that the caster-equipped crossbar 9 extends transversely of the superjacent end of the board 5. If it is desired to ripsaw the board 5 on a line that is parallel to the side edges of the board, the board is fed longitudinally towards the saw 6. In connection with the first or initial increment of feed movement of the board towards the saw, the casters 10 swing or swivel in the direction of movement of the board into a position wherein the wheels 24 are in parallel relation with the direction of movement as shown in Figure 1. When the wheels are so positioned, the contact lines of the wheels with respect to the bottom surface of the board extend at true right angles to the direction of movement of the board and hence the wheels tend to remain in parallel relation with the direction of movement of the board and thus serve frictionally and automatically to guide the board rectilinearly in connection with completion of feed movement thereof toward the saw. Because of the automatic rectilinear guiding tendency of the wheels of the casters, the line of cut by the saw is straight and parallel to the side edges of the board as desired. If it is desired to cross-cut the board 5, the board is moved or fed in a transverse direction towards the saw. In connection with the first or initial increment of movement, the casters 10 swing or swivel into a position wherein the wheels thereof are in longitudinal alignment as shown in Figure 2. In connection with the following increments of transverse feed movement of the board towards the saw, the free end of the board, i.e., the end of the board that is remote from the saw, travels successively over the wheels of the casters. In the event that the end of the board that is being worked upon by the saw or other power operated or driven tool is moved other than rectilinearly, say, for example, in a circular course, the free end of the board moves correspondingly and this is permitted by reason of the fact that the casters are free to rotate or swivel about vertical axes.

The herein described universal work support effectively and efficiently fulfills its intended purpose and this is directly attributable to the fact that the rotary members on the crossbar are in the form of freely rotatable offset wheel variety casters. By reason of the fact that the peripheries of the wheels of the casters are cylindrical, the workpiece surface that is engaged by the wheels is not likely to be marred or scored. Because of the particular design and construction of the support, the latter is capable of being produced or fabricated at a comparatively low cost.

The invention is not to be understood as restricted to the details set forth since these may be modified within the scope of the appended claims without departing from the spirit and scope of the invention.

Having thus described the invention what I claim as new and desire to secure by Letters Patent is:

1. As a new article of manufacture, a universal work support adapted movably to support one end portion of an elongated workpiece while the other end portion of the workpiece is manipulated with respect to a power operated or other tool and comprising a base, a standard connected to, and extending upwards from the base, a horizontally extending crossbar having the central portion thereof connected to the upper end of the standard, and a plurality of spaced apart inverted offset wheel variety casters positioned along the crossbar, each of said casters comprising a yoke member having parallel spaced yoke arms and a connecting base portion, a pintle secured to and projecting from said base portion, a pivot pin extending across the free ends of said yoke arms, a work-engaging wheel rotatably mounted on said pivot pin between said yoke arms, said pivot pin being displaced laterally from said pintle, the pintles of the various casters being mounted for rotation about respective spaced apart vertical axes in said crossbar whereby said wheels are free to rotate about the axes of their respective pivot pins and whereby they are free to revolve bodily about the axes of their respective pintles, said wheels being adapted to assume a trailing position relative to their respective pintles when the workpiece is slid horizontally in any given direction over said wheels, whereby said workpiece is constrained by its tractional engagement with said wheels to maintain such horizontal directional movement.

2. A universal work support according to claim 1 and in which the casters are arranged in a rectilinear horizontal series and equidistantly spaced relation and have the peripheries of the wheels thereof comparatively wide and cylindrical.

3. A universal work support according to claim 1 and wherein the crossbar is hollow in rectangular cross section and embodies vertically spaced horizontal top and bottom walls, and the depending pintles of the casters extend through, and are mounted rotatably in, vertically aligned holes in the top and bottom walls of the crossbar.

References Cited in the file of this patent

UNITED STATES PATENTS

| | | |
|---|---|---|
| 1,760,304 | Feldin | May 27, 1930 |
| 2,237,615 | Roberts | Apr. 8, 1941 |
| 2,699,188 | Caldwell | Jan. 11, 1955 |